United States Patent [19]
Rudd et al.

[11] Patent Number: 5,995,347
[45] Date of Patent: Nov. 30, 1999

[54] METHOD AND APPARATUS FOR MULTI-FUNCTION ELECTRONIC MOTOR PROTECTION

[75] Inventors: Jeffrey P. Rudd, Sharon; Byron T. Yarboro, Attleboro, both of Mass.

[73] Assignee: Texas Instruments Incorporated, Dallas, Tex.

[21] Appl. No.: 09/037,210

[22] Filed: Mar. 10, 1998

Related U.S. Application Data

[60] Provisional application No. 60/046,124, May 9, 1997.

[51] Int. Cl.⁶ .................................................. H02H 5/04
[52] U.S. Cl. .............................. 361/24; 361/28; 361/85; 361/93.6; 361/93.8; 361/97; 361/93.2
[58] Field of Search .................................. 361/103, 106, 361/93–94, 96–97, 99, 76–78, 85, 87, 24–25, 27–28, 93.1, 93.2, 93.5, 93.6–93.8, 93.9

[56] References Cited

U.S. PATENT DOCUMENTS

| | | | |
|---|---|---|---|
| 4,281,358 | 7/1981 | Plouffe et al. | 361/22 |
| 4,319,298 | 3/1982 | Davis et al. | 361/24 |
| 4,573,132 | 2/1986 | Boothman et al. | 361/24 |
| 4,682,101 | 7/1987 | Cattaneo | 324/536 |
| 5,179,364 | 1/1993 | Marquardt | 335/172 |
| 5,179,495 | 1/1993 | Zuzuly | 361/94 |
| 5,570,258 | 10/1996 | Manning | 361/85 |

*Primary Examiner*—Michael J. Sherry
*Attorney, Agent, or Firm*—Russell E. Baumann; Richard L. Donaldson

[57] ABSTRACT

A multi-function protection system (8) for protecting electrical equipment such as a screw compressor motor is shown having a housing (10, 20) mounting current sensing toroids (CT1, CT2, CT3) and associated circuitry as well as associated circuitry for temperature sensing PTC resistors (S1, S2, S3) adapted to be placed in heat conductive relation with respective windings of the motor. The circuitry is connected to an analog-to-digital converter or ADC (U6) which provides a binary coded input to a micro-controller (U5). The micro-controller performs protection sub-routines to control an output switch (Q4) which in turn controls the state of energization of a relay (K1) coupled to the screw compressor motor. The circuitry includes a current unbalance section (30a, 30b), an over temperature section (32), a low voltage cut-out circuit (33), a current transducer section (35), a signal conditioning circuit (36a, 36b, 36c), a micro-controller section (40) incorporating a shorted sensor protection system, current overload calibration section (41) and fault diagnostic section (42). A fault bank routine filters transient voltages resulting from industrial or environmental electromagnetic interference (EMI) for current overload, current imbalance and over temperature transient voltages to distinguish real fault conditions from EMI transients.

9 Claims, 10 Drawing Sheets

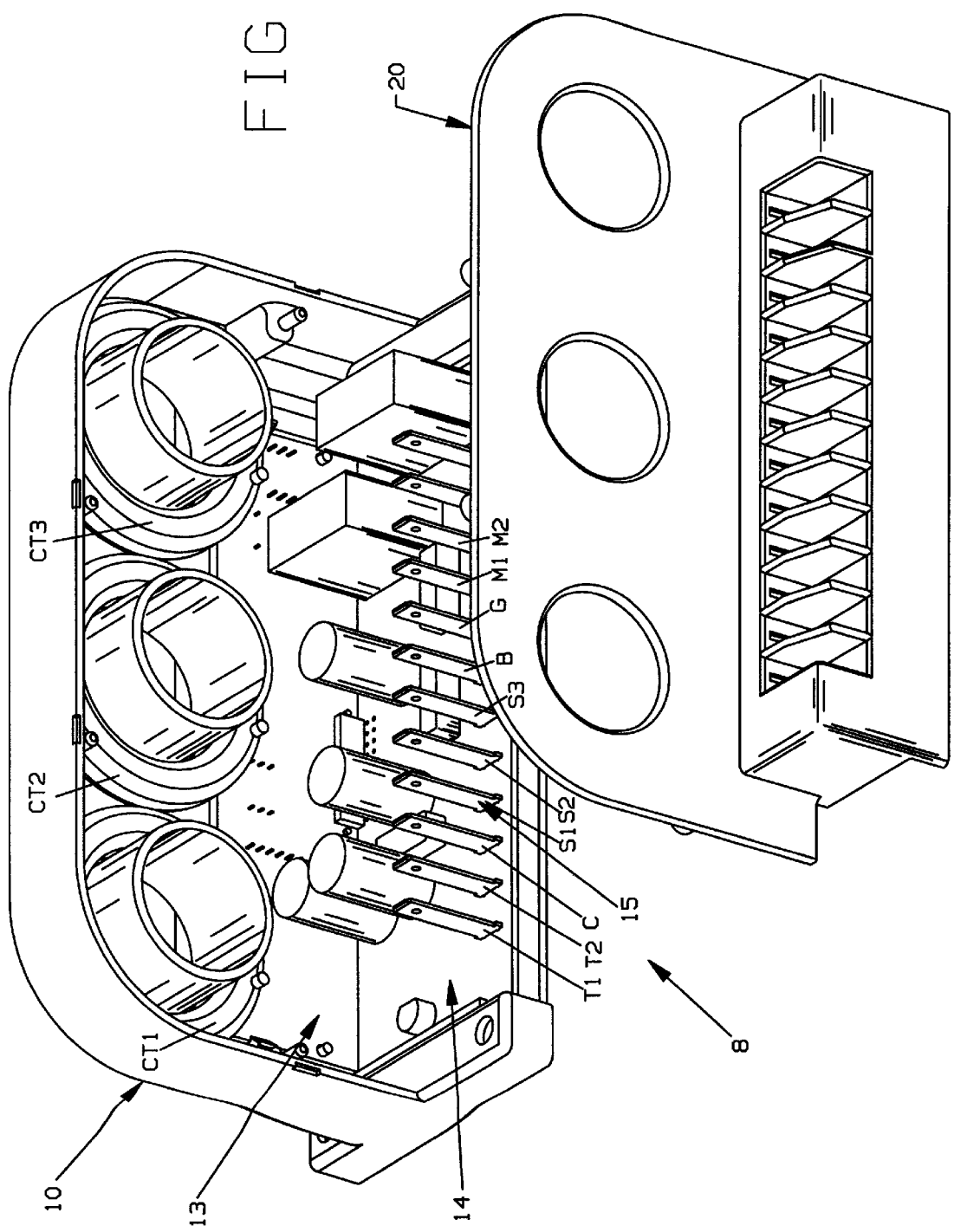

METHOD AND APPARATUS FOR MULTI-FUNCTION ELECTRONIC MOTOR PROTECTION

This application claims priority under 35 USC Section 119 (e) (1) of provisional application No. 60/046,124 filed May 9, 1997.

FIELD OF THE INVENTION

This invention relates generally to motor protection for compressors and more specifically to a multi-function protection system and method particularly adapted for screw compressors.

BACKGROUND OF THE INVENTION

Systems for protecting motors from current overload conditions comprising one or more current sensors disposed in a current overload transfer function with respect to percentage of phase current and time are well known in the prior art. Examples of such systems are set forth in U.S. Pat. No. 5,179,364 and 5,179,495. In these systems, an all solid state protection circuit utilizes one or more current transformers which are responsive to the motor phase current. These current transformers are connected into a timer circuit which in turn is used to control the current overload conditions and de-energize a control relay. Current transformers have also been used to measure actual phase current of the motor. For example, a current transformer disclosed in U.S. Pat. No. 4,682,101 is used in a system to provide a DC voltage which is proportional to the AC current flowing into a motor. A control system may use a current transducer to protect against current overload conditions as well as an input system which is used to operate a compressor more efficiently under time varying load conditions.

There are effective systems that protect against improper sequence of a three phase current from being applied to electrical equipment such as scroll compressors. Energization of a scroll or screw compressor with an improper sequence of the three phase power supply can result in mechanical failure. One effective system is set forth in U.S. Pat. No. 5,570,258. In this system, an all solid state protection circuit is used to monitor the voltage level of each phase of the power supply and upon detection of an improper phase sequence or loss of a phase the control is used to de-energize a switch. Although this has proven to be an effective means of protecting against improper phase sequence, there is a need to provide additional functions which provide a more efficient and effective protection system, particularly for screw compressors.

U.S. Pat. No. 4,281,358 shows a protection system having over temperature protection including thermal sensors placed in heat transfer relation with the windings of a dynamoelectric machine which includes a minimum off delay timer to prevent rapid cycling and a low voltage cut-out network to protect the machine in the event of the occurrence of low voltage conditions.

While the above described systems for current overload, over temperature improper phase sequence, off delay timer and low voltage cut-out features have proven to be effective, there still is a need to provide functions which will protect a screw compressor form these and other deleterious conditions in a more effective and efficient manner.

SUMMARY OF THE INVENTION

An object of the present invention is to provide a method and system which not only protects a screw compressor from over temperature and current overload conditions but also one which provides inherent protection needed for screw compressors. Another object of this invention is to provide a highly reliable, cost effective method and solid state system which will protect a screw compressor motor from a plurality of conditions including over temperature, current overload, current unbalance, improper phase sequence, low voltage and too rapid cycling of the compressor. Yet another object for this invention is to provide a protection method and system having several functions which cooperate with one another to ensure more complete protection of the screw compressor and motor.

Briefly described, a multi-function electronic motor protection system in accordance with the invention provides a temperature sensing circuit and current transducer circuit connected to an analog-to-digital converter (ADC) which in turn sends a binary coded data input into a micro-controller unit (MCU) which performs protection sub-routines used to control a switch.

The system includes the following functions:

A temperature sensing circuit which includes one or more channels each comprising a PTC sensor adapted to be mounted in heat transfer relation with a respective winding of a compressor motor to be protected. The PTC sensor is connected to a reference resistor in a voltage divider which is coupled through a current limiting resistor to an analog-to-digital converter. The divider junction voltage, proportional to the thermal sensor's heat transfer function, is coupled into the ADC. The ADC converts this signal into a binary coded value of each sensor resistance and transmits this binary data into the micro-controller. Once the sensor resistance reaches a selected determined trip resistance value stored within the micro-controller, the MCU will turn off the control relay. The micro-controller uses a selected reset resistance value stored in memory to provide a hysteresis so that there is a temperature differential between trip and reset conditions. Shorted sensor protection is provided by using the MCU to compare a pre-determined shorted sensor resistance value with the sensed voltage across each of the PTC sensors. When any of the sensors' resistance drops below this shorted sensor limit, the MCU will de-energize the control relay.

An output circuit comprising a transistor controlled by the MCU and coupled to and controlling the coil voltage of a single pole, single throw (SPST) relay. This arrangement provides isolation between the input and control circuits.

A minimum off delay timer section which employs a sub-routine which performs a count-down sequence. Once the count down has been completed, the circuit will re-energize assuming all other conditions are satisfactorily met.

A low voltage cut-out circuit arranged to turn off the control relay when the input supply voltage decreases below a selected pre-determined low voltage level. Alternating voltage is rectified and filtered to produce a dc voltage into an operational amplifier. A reference voltage is created by a zener diode which is connected to the op amp. As the dc voltage decreases below a pre-determined low voltage cut-out level, the output of the op amp will switch and, through a current limiting resistor, will change the logic level into an input of the MCU. The low voltage input signal is used within an interrupt routine to turn off the control relay. The system automatically resets once the minimum off timer has completed the countdown sub-routine and the AC supply voltage is above the pre-determined low voltage cut-in level.

A three phase current transducer circuit comprising three current toroids, a full wave bridge rectifier, filter capacitors, and loading resistors is used to sense the phase current of the compressor motor. The dc voltage from each of the three phase current transducer circuits is connected through two current limiting resistor circuits. The first circuit, comprising a voltage divider connected to the inputs of the ADC, is used by the MCU to accurately measure the phase currents on a high range. The second circuit, comprising a single current limiting resistor, connected to the same ADC, is used by the MCU to accurately measure phase current on a low range. The MCU compares a pre-determined current value to actual sensed phase current to determine which of the two input ranges to use for current related protection functions and current output measurements.

A fault bank feature which provides a means for using the MCU to compensate for transient wave forms resulting from electromagnetic interference and properly identify over temperature, current overload, current unbalance, improper phase sequence and loss of phase conditions. The fault bank is a counter that is incremented by the MCU for each sample that is interpreted as an unacceptable condition. When the MCU identifies a sample as acceptable, the MCU decrements the fault bank. Upon incrementing the fault bank counter to a pre-determined value, the MCU interprets the condition as being valid, i.e., the condition is a real fault condition and not caused by a voltage transient, and in turn de-energizes the switch.

A current overload function which uses the dc voltage from the phase current transducer circuit which is connected into the ADC and transmitted as binary coded input into the micro-controller. A current overload sub-routine compares the sensed motor compressor currents with several selected pre-determined levels. For screw compressors, the current overload protection provides a relationship between the motor's operating current and pre-determined current overload levels. Upon detection of overload current conditions, the MCU will cause a transistor to change its state of conduction which in turn controls the state of energization of a switch.

A current unbalance function which uses the electrical phase relationship between phases to determine if an unbalance phase condition exists during the normal compressor operation. The MCU uses the binary coded inputs of the current transducer circuit connected into the ADC to perform a current unbalance routine. The MCU compensates for the compressor operation and the load on the screw compressor motor by using a selected pre-determined operating current level. For sensed current below this operating current level, the MCU calculates the current unbalance condition for an unloaded compressor. For phase current greater than or equal to the operating current level, the MCU compensates for the current unbalance condition for a loaded compressor operation. The current unbalance routine's compensation for loaded and unloaded compressor operation prevents nuisance compressor cycling and an effective and efficient means of protecting against current unbalance conditions.

BRIEF DESCRIPTION OF THE DRAWINGS

Other objects, advantages and details of the novel and improved method and apparatus for a multi-function electronic motor protection system appear in the following detailed description of the preferred embodiment of the invention, the detailed description referring to the drawings in which:

FIG. 3 is an exploded view of the cover and base that comprise the housing of the protection apparatus made in accordance with the invention;

DESCRIPTION OF THE PREFERRED EMBODIMENTS

Figure 1:
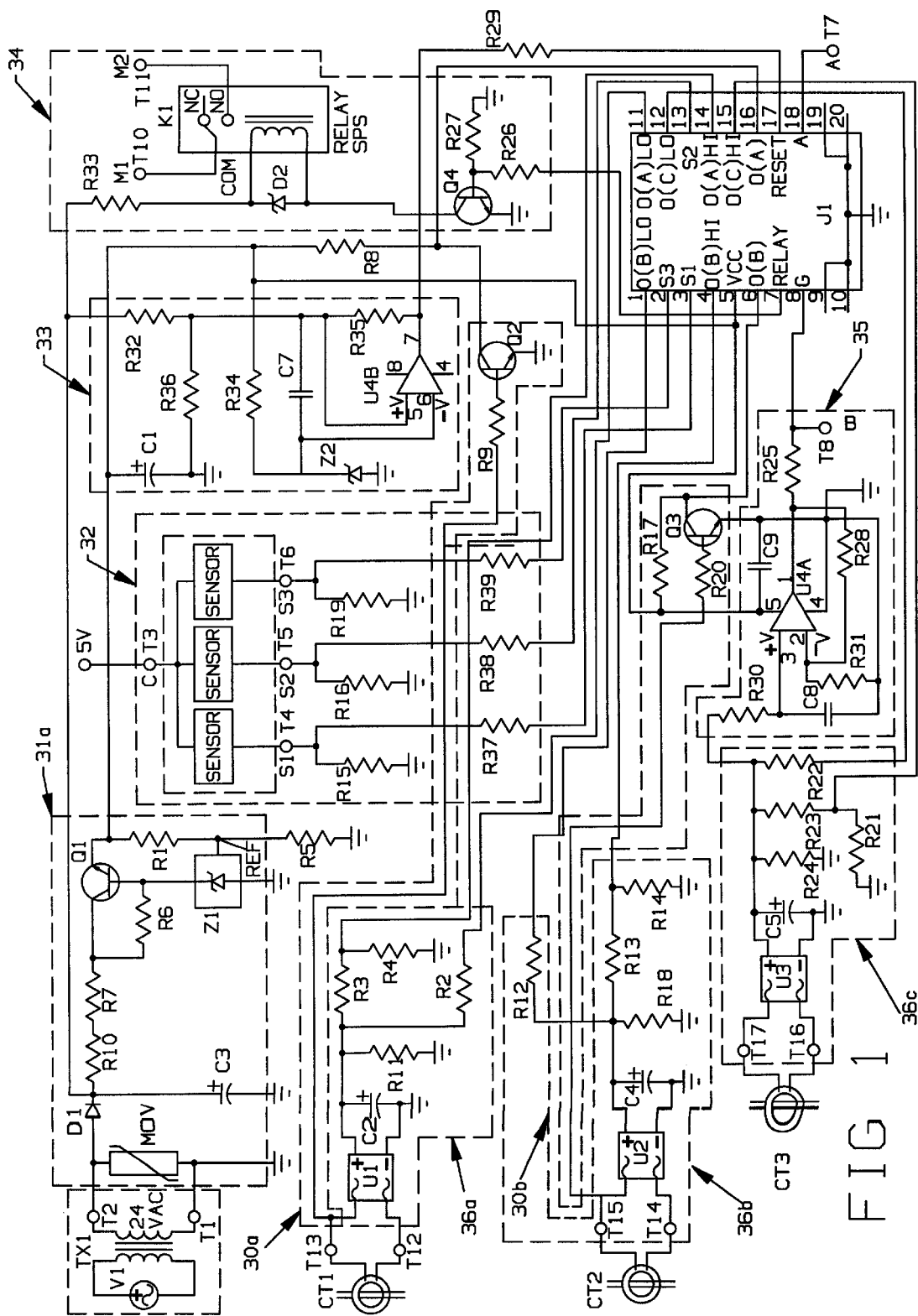
FIGS. 1, 2a and 2b taken together are schematic circuit diagrams of the protection apparatus made in accordance with the invention.
Figure 2A:
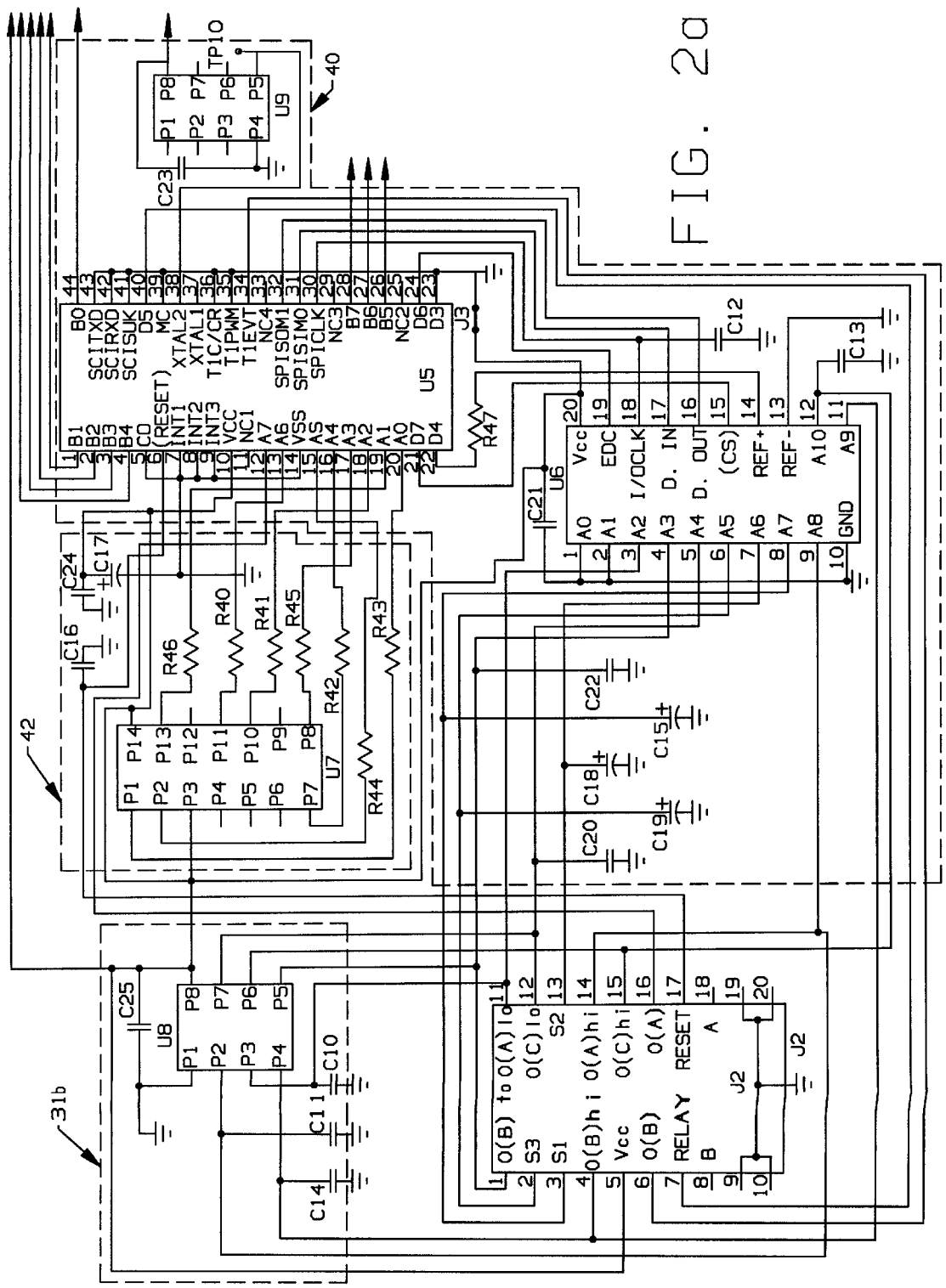
Figure 2B:
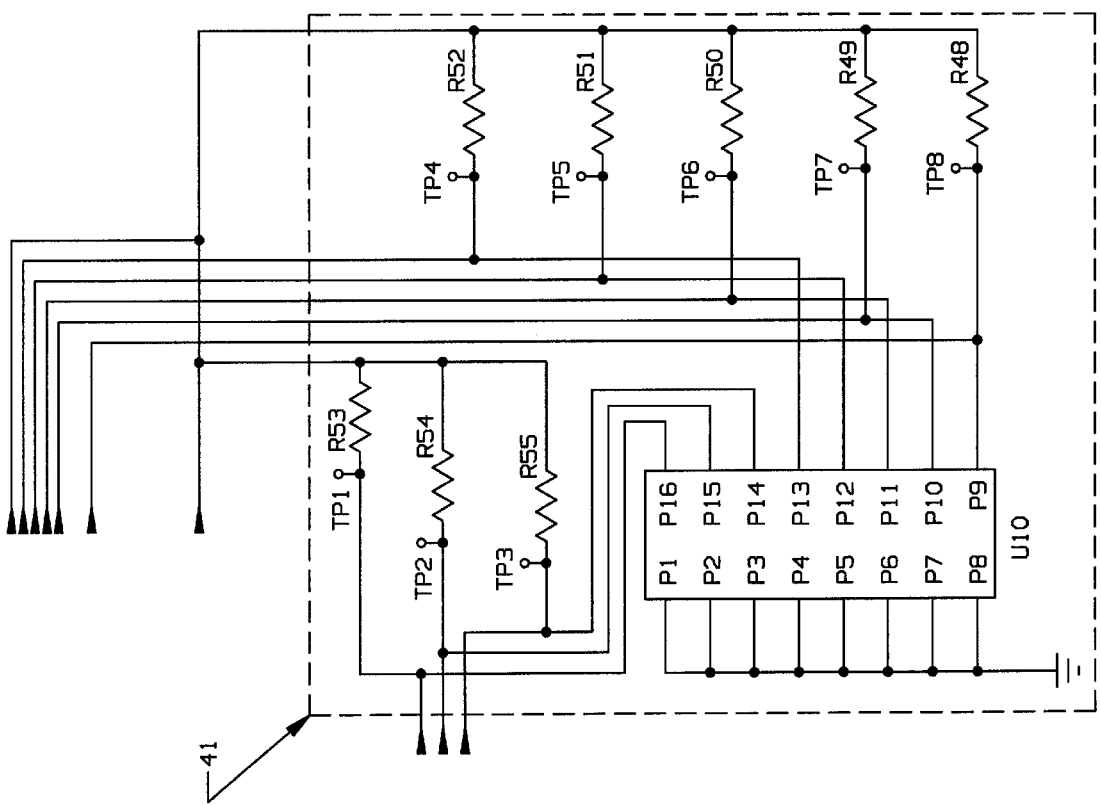

With reference to FIG. 3, a multi-function electronic motor protection apparatus 8 made in accordance with the invention is shown which comprises a plastic base 10 and cover 20, three current transducers CT1, CT2, CT3, a circuit board assembly 14 for the schematic shown in FIG. 1 and a circuit board assembly 13 for the schematic shown in FIGS. 2a, 2b. Terminals 15 comprising T1, T2, C, S1, S2, S3, B, G, M1 and M2 provide external connection to the temperature sensing circuit, output circuit, power supply section, and current transducer circuit.

FIG. 1 comprises a power supply section 31a, an improper phase sequence section 30a, 30b a signaling conditioning circuit 36a, 36b, 36c, an over temperature section 32, a low voltage cut-out circuit 33, output control circuit 34, and a current transducer section 35. FIGS. 2a, 2b comprise a micro-controller section 40 which includes a shorted sensor protection system, current overload calibration section 41, fault diagnostic section 42 and power supply section 31b. The circuits of FIGS. 1, 2a and 2b are interconnected by means of jumper J1 of FIG. 1 and jumper J2 of FIG. 2a.

The over temperature section 32 includes one or more channels, three being shown, each comprising a PTC sensor S1, S2, S3 respectively, each connected to a reference resistor R15, R16, R19, respectively in a voltage divider which is coupled through a current limiting resistor R37, R38, R39, respectively into an analog-to-digital converter U6 shown in FIG. 2a. The voltage of the voltage divider junction is proportional to the thermal sensor's heat transfer function and serves as a reference voltage which is coupled into the ADC U6. The ADC transmits binary data into micro-controller U5 which is a binary coded value of each sensor resistance. Once the sensor resistance reaches a selected pre-determined trip resistance value stored within the micro-controller, the MCU U5 will turn off control relay K1 to be discussed below. The micro-controller uses a selected reset resistance value stored in memory to provide a hysteresis so that there is a temperature differential between trip and reset conditions. Shorted sensor protection is provided by using MCU U5 to compare a pre-determined shorted sensor resistance value with the sensed voltage across each of the PTC sensors. When any of the sensor's resistance drops below this shorted sensor limit, the MCU will de-energize the control relay.

The output control circuit 34 comprises a transistor Q4 controlled by MCU U5. Transistor Q4 is coupled to and controls the coil voltage of a single pole, single throw SPST relay K1. This arrangement provides isolation between the input and control circuits.

A low voltage cut-out circuit 33 is arranged to turn off the control relay when the input supply voltage decreases below a pre-determined low voltage level. Alternating supply voltage is rectified by diode D1 and filtered by capacitor C7 to produce a dc voltage into the positive input of an operational amplifier U4B. A reference voltage is created by a zener diode Z2 and is connected to the negative input of the op amp. As the dc voltage decreases below a pre-determined low voltage cut-out level, the output of the op amp will switch and, through a current limiting resistor R29 will change the logic level into a reset input pin 6 of MCU U5. MCU U5 automatically resets once the minimum off timer has completed a count down sub-routine and the ac supply voltage is above the pre-determined low voltage cut-in level.

The signal conditioning circuit 36a, 36b, 36c comprising three current toroids CT1, CT2, CT3, each connected to a respective full wave bridge rectifier U1, U2, U3, filter capacitor C2, C4, C5, and load resistor R11, R18, R24, is used to sense the phase current of a compressor motor. The dc voltage from each of the three phase current transducer circuits is connected through two current limiting resistors circuits. The first circuit, comprising a voltage divider R3, R4; R13, R14; R23, R21, respectively, connected to the inputs of ADC U6, is used by the MCU to accurately measure the phase currents on a high range. The second circuit, comprising a single current limiting resistor R2, R12, R22, respectively, connected to the same ADC, is used by the MCU to accurately measure phase current on a low range. MCU U5 compares a pre-determined current value to actual sensed phase current to determine which of two input ranges to use for current related protection functions and current output measurements.

An improper phase sequence or current unbalance circuit 30a, 30b utilizes two current toroidal transformers CT1, CT2 of circuit 36a, 36b, each connected in series to a current limiting resistor R9, R20, respectively, in turn connected to the base of a transistor Q2, Q3, respectively, in order to use the electrical phase relationship between phases to determine if an unbalance phase condition exists during normal compressor operation. MCU U5 uses the binary coded inputs of the current transducer circuit connected into the ADC U6 to perform a Call Phase routine (250, FIG. 7) to be discussed below. Assuming the bypass jumper J3 located on FIG. 2a of the circuit board assembly 13 is not present, MCU U5 compares the sequence between phase current A and phase current B. Upon detection of an improper phase sequence, the MCU de-energizes the control switch.

As seen in FIG. 1, the power supply circuit 31a includes terminals T1, T2, where terminal T1 is connected to common and terminal T2 is connected to a half-wave rectifier comprising a rectifier diode D1 which is serially connected to current limiting resistors R10, R7. Resistor R7 is connected to the collector of PNP transistor Q1 and is also connected to a reference resistor R6 which establishes a reference voltage by means of a zener diode Z1 connected to the base of transistor Q1. A voltage divider comprised of two resistors R1 and R5 with resistor R1 connected to the emitter of transistor Q1 establishes a 5 volt power supply at the emitter of transistor Q1. The junction of resistors R1 and R5 is connected to the reference zener diode.

An outside supply voltage which is rated for 24 volts is connected to terminals T1 and T2. A varistor MOV is connected in parallel to terminals T1 and T2 to provide protection against high energy transient voltages resulting from environmental or industrial emi services. A capacitor C3 is connected to the cathode of diode D1 and resistor R10 to smooth out the half-wave which is regulated to 30 volts by resistors R10, R7 zener diode Z1, and transistor Q1.

The shorted sensor protection circuit comprises reference voltage dividers using resistors R15, R16 and R19 of over-temperature section 32 connected to current limiting resistors R37, R38 and R39, respectively across a regulated power supply and common. The resulting voltage divider junctions T4, T5 and T6 are connected to input pins 6, 7 and 8, respectively, of analog-to-digital converter ADC U6. Output pin 16 of ADC U6 is connected into the micro-controller U5 whose pin 32 is used as an input signal of a serially transmitted binary equivalent resistance of the temperature dependent resistor S1, S2, S3, respectively, connected in parallel between the power supply and the junctions of T4, T5 and T6. A call temp routine (270, FIG. 7) to be discussed below, compares the resistance of each PTC temperature resistor S1, S2, S3, respectively, which is read into pin 32. Upon detecting a sensor resistance below the shorted sensor trip level, the MCU de-energizes the control switch K1.

Figure 6:
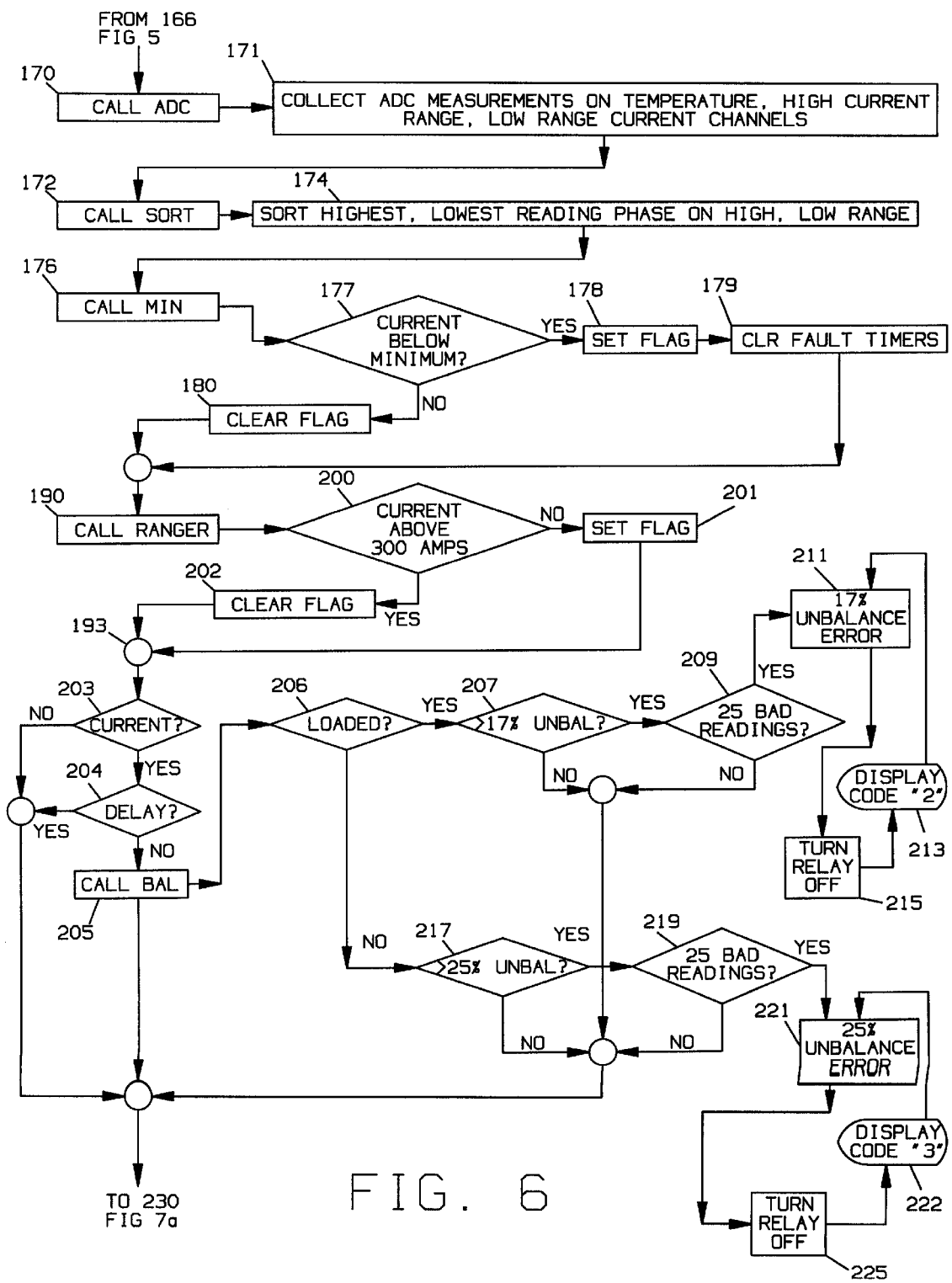

Current unbalance circuit 30a, 30b, mentioned above, provides protection of the compressor against energizing of the motor under improper phase sequence conditions. The current unbalance circuit is comprised of input pins 1 through pin 6 of ADC U6 of the signal conditioning circuit 36a, 36b, 36c. Call Bal routine (205, FIG. 6) to be discussed below, compensates for the compressor operation and the load on the screw compressor motor by using a selected pre-determined operating current level such as 65% of a must hold level. The must hold level is calibrated by setting of the DIP switches U7 in section 42, to be discussed below. For sensed current below this operating current level, the MCU calculates the current unbalance condition for an unloaded compressor. For phase current greater than or equal to the operating current level, the MCU compensates for the current unbalance condition for a loaded compressor operation. The current unbalance routine's compensation for loaded and unloaded compressor operation prevents nuisance compressor cycling and an effective and efficient means of protecting against current unbalance conditions.

Figure 8:
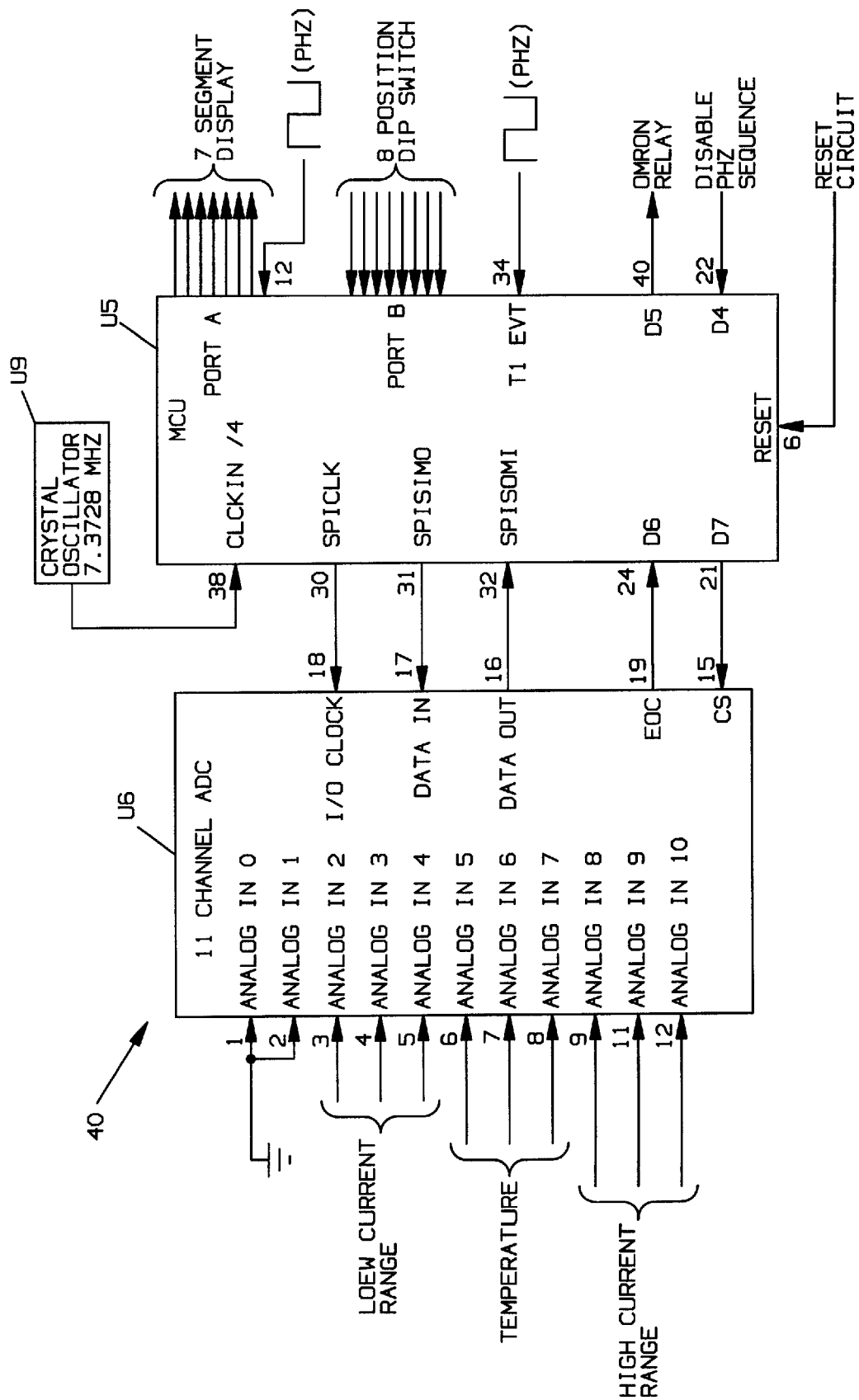
FIG. 8 is an enlarged schematic showing the input and output connection for the analog-to-digital converter and the micro-controller shown in FIGS. 2a, 2b.

With particular reference to FIG. 8, micro-controller section 40 includes analog-to-digital converter U6 and micro-controller MCU U5 having software for providing, along with the previously described circuit sections, the current overload protection, over temperature protection, current unbalance protection, loss of phase protection, improper phase sequence protection, shorted sensor protection, low voltage cut-out protection, current measurement, minimum off delay and control switching functions described above. The micro-controller U5 (FIGS. 2a and 8) is connected to the ADC U6, oscillator U9, calibration switches U10, output control circuit 34, low voltage cut-out circuit 33, signal conditioning circuit 36a, 36b, 36c and fault diagnostic circuit 42. Diagnostic circuit 42 comprises U7, a seven segment display along with resistors R40–R46, connected to pins 13 and 15–20 of micro-controller U5. The ADC U6 analog in 2, 3, 4 pins correspond to the low current range 5–100 amps circuit for current transformers CT1, CT2 and CT3. ADC U6 analog in 8, 9, 10 pins correspond to high current range 100–900 amps circuit for current transformers CT1, CT2, CT3. ADC analog in 5, 6, 7 pins correspond to the over temperature circuit's PTC output voltage whose voltage to resistor relationship is used by the MCU to determine over temperature conditions which create a change in PTC resistance proportional to the increase in motor winding temperature. ADC U6 pins designated as I/O CLK (18) and CS (15) are respectively connected to the MCU pin SPICLK (30) and D7 (21). MCU begins conversion by changing logic level across the 21 pin and common. The MCU U5 and ADC U6 are synchronized by the MCU pin 30 whose logic level voltage acts as the clock signal which establishes ADC U6 timing of conversion. ADC U6 output EOC pin 19 is used to send a signal to MCU U5 D6 pin 24 to indicate the end of analog-to-digital conversion. DATA OUT pin 16 of ADC U6 is connected to the SPISOMI pin 32 of MCU U5 and is used by the MCU program to measure phase current and motor winding temperature from the current transformers CT1, CT2 and CT3 and PTC temperature dependent sensors S1, S and S3, respectively.

Figure 4:
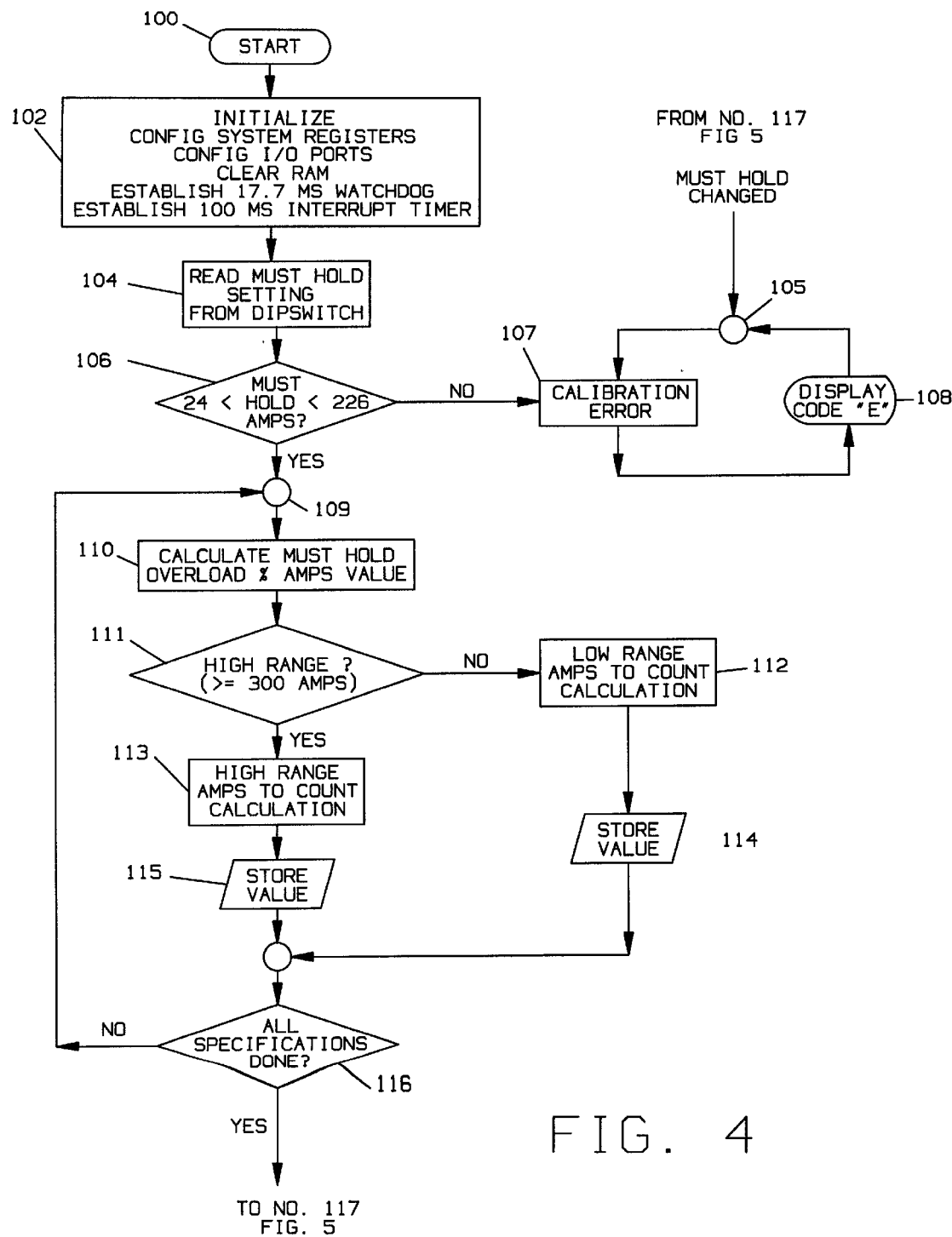
FIGS. 4 through 7, taken together, form a flow chart of the protection apparatus made in accordance with the invention.
Figure 5:
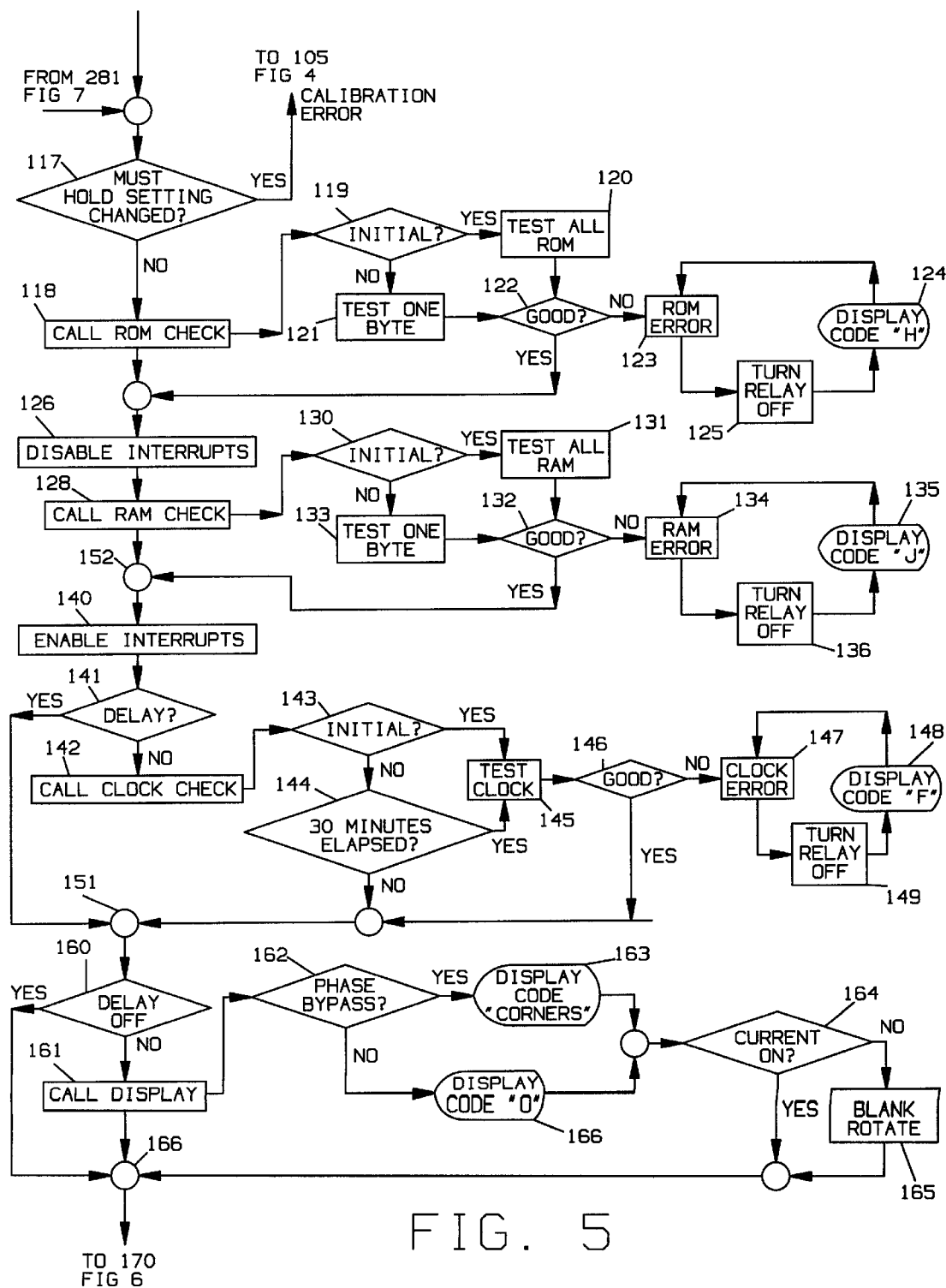

MCU CLCKIN/4 pin (38) provides internal clock signal from oscillator U9 pin P5. Clock signal establishes MCU U5 operating speed for performing software emulation. MCU port A pins 19, 18, 16, 20, 15, 17 and 13 are connected to current limiting resistors R40, R41, R42, R43, R44, R45 and R46, respectively, which in turn are respectively connected into the seven segment display U7 P13, P10, P7, P1, P2, P8 and P11. MCU A7, TIEVT pins (12, 34) provide the logic level voltage signal from the current unbalance circuit corresponding to phase A and phase B. Upon detecting an improper phase sequence, MCU 5 will de-energize control switch K1. MCU pins designation as pins B0 to B7 are connected respectively to current limiting resistors R48–R55 which in turn are connected to dip switch 10 pins P9–P16, respectively. Dip switch U10 pins P1 through P8 are connected to common. The 5 volt power supply is connected to resistors R48–R55. MCU software routine 106, FIG. 4, uses a binary coded byte for an equivalent current, must hold, calibration set point. The MCU uses this set point to perform current overload protection. MCU pin 40 is used for a logic level output voltage to provide a signal to the control circuit. Upon detection of conditions resulting in the protection system turning off the compressor, the output D5 pin 40 de-energizes the control switch circuit. MCU D4 pin 22 connects to power supply circuit. MCU sub-routine 142, FIG. 5, compares 60 Hz signal to oscillator frequency and upon detection of unacceptable oscillator conditions, the MCU de-energizes the control switch.

Current transducer section 35 is provided to communicate phase motor current of a compressor by using one current transducer, CT3, connected to a full wave bridge rectifier U3 in turn connected to a capacitor C5 in parallel with the current transformer. A current limiting resistor R30 is connected to an operational amplifier U4A pin 3 and filter capacitor C8. Voltage reference resistors R31 and R28 are connected to operation amplifier U4A pin 2. Power supply voltage is connected to pin 5 of op amp U4A, capacitor C9 and reference voltage resistor R17. Op amp U4A pin 1, connected to the junction of resistor R28 and resistor R25, provides a voltage proportional to a current range of 0 to 275 A.

A minimum off delay is provided to prevent rapid cycling of the compressor motor by enabling an off delay of a selected interval each time the control circuit has been turned off for either over temperature or low voltage conditions. MCU U5 employs call temp routine 270, FIG. 7, to be discussed below, to perform the minimum off delay timing sequence following over temperature and low voltage conditions which result in de-energizing the compressor. A binary coded byte is used by the MCU to decrement until the byte is cleared. Upon clearing the minimum off delay register, the MCU will re-energize the switch assuming all conditions meet acceptable levels.

With reference to FIGS. 4–7, protection software begins with start command 100 and initialization of MCU registers, I/O ports, clear RAM, set-up watch dog timer and set-up interrupt timer 102. MCU 5 reads the must hold current setting at 104 which is the logic level voltages for each of the eight switches used in the current overload calibration circuit 41 of FIG. 2b. If the current calibration is not within an acceptable current range of 25 A ac to 225 A ac, steps 106, 107 which includes a sub-routine (not shown) which can de-energize the output circuit, and 108, the MCU will de-energize the output circuit 34 of FIG. 1 and set the fault diagnostic circuit 42 of FIG. 2a for a calibration error detected, code E. Otherwise, the must hold current overload is calculated at step 110 and at block 111 a decision is made whether that value is greater than 300 amps and, if so, goes into a high range at step 113 and stores a value at 115 and if the must hold value is less than 300 amps the routine goes into a low range at step 112 and stores a value at 114. The routine loops back to 109 following a negative decision at 116 and goes on to step 117 if the decision is positive. The MCU checks the Must Hold setting 117 and if a change is detected, the MCU moves to the calibration error routine 105 and turns off the output circuit. The MCU performs Call ROM Check routine 118, comprising steps 119, 120, 121, 122, 123, 124 and 125 of FIG. 5. Upon detection of any defective ROM, the software sets the fault diagnostic circuit 42 of FIG. 2a for a ROM error code H and turns relay K1 off. Otherwise, the MCU jumps to Disable Interrupt routine 127 and 126 of FIG. 5 which in turn begins the Call RAM Check routine 128. The MCU then performs Call RAM Check routine 128, comprising steps 130, 131, 132, 133, 134, 135 and 136, respectively, of FIG. 5. Upon detection of any defective RAM, the software sets the fault diagnostic circuit 42 of FIG. 2a for a RAM error code J and turns off the output circuit. Otherwise, the MCU jumps to the Enable Interrupts routine 152 and 140 of FIG. 5. If there is no delay at 141 the routine goes to a Call Clock routine 142, which comprises steps 143, 144, 145, 146, 148 and 149, respectively, used by the MCU to compare the oscillator U9 clock frequency to a 60 Hz signal from the power supply section 31a of FIG. 1. Upon detection of an unacceptable oscillator U9 clock frequency, the MCU sets the fault diagnostic circuit 42 of FIG. 2a with a Clock Error code F and turns off the output circuit. Otherwise, the MCU jumps to the Call Display routine 150 and 151 and at 160 determines whether relay K1 is off. If the relay is off the routine goes to 166 and if the relay is on the routine goes to Call Display routine 161, comprising steps 161, 162, 163, 164 and 165 used by the MCU to check if the phase bypass jumper J3 is connected to the circuit of FIG. 2a. Upon detection of the Bypass Jumper, the MCU will not use the improper phase sequence circuit 30a, 30b. Otherwise, the MCU will perform the sub-routine for improper phase sequence 250 of FIG. 7. The MCU uses a current detection routine 164 and 165 to determine if motor current has been detected. Upon completion of the current detection sub-routine 164, 165 and 166, the MCU software begins a Call ADC routine 170 and 171 (FIG. 6) which collects the temperature sensor resistance, high and low current measurement for each of the three toroidal sensors CT1, CT2 and CT3 of FIG. 1. The routine then goes to a Call Sort routine 172 and 174 used to sort the current measurements. A Call Min routine 176, comprising steps 177, 178, 179 and 180 is then used to detect current above a minimum acceptable threshold of 8 A ac and upon completion the software begins a Call Ranger routine 190, comprising steps 200, 201 and 202.

Figure 7A:
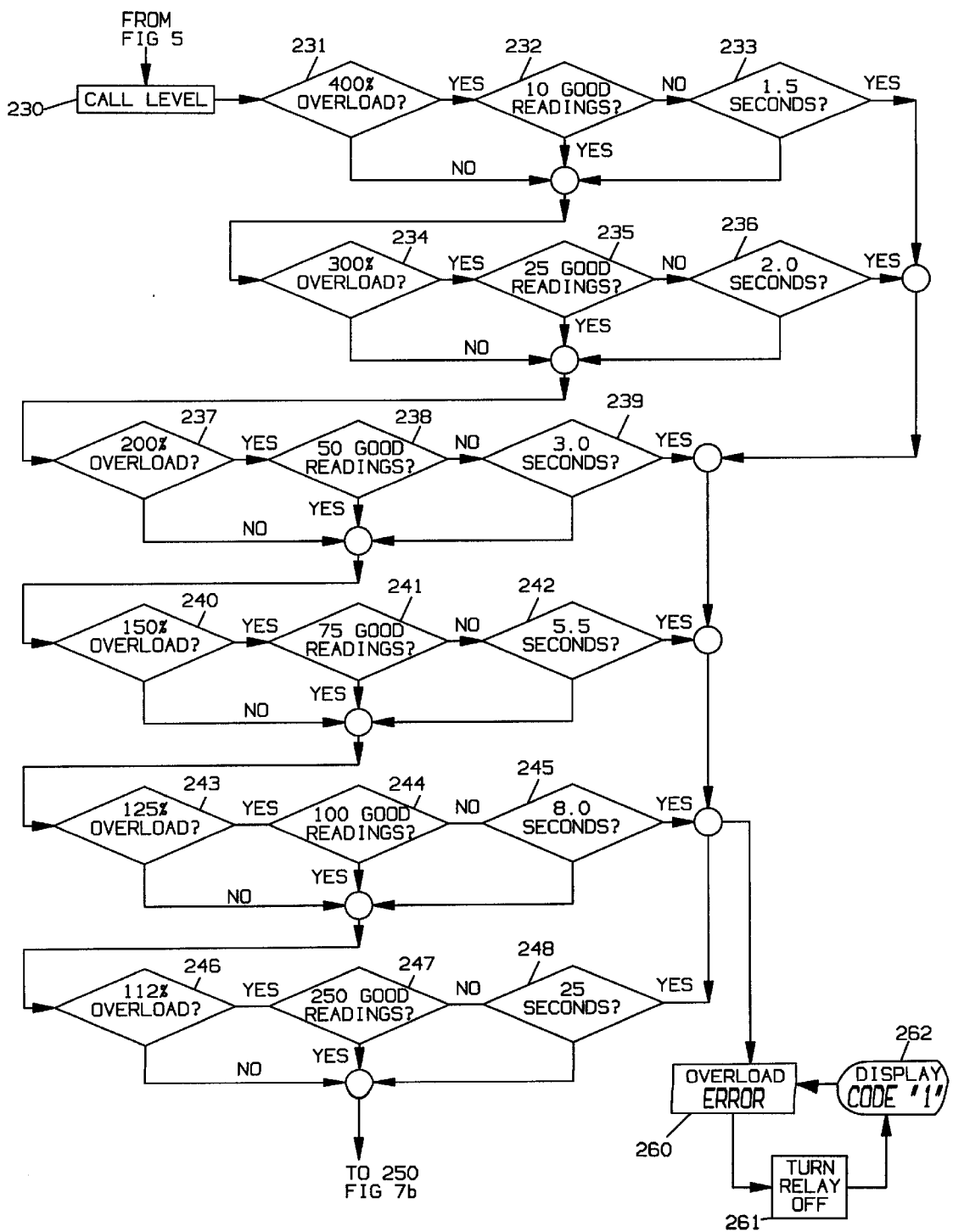
Figure 7B:
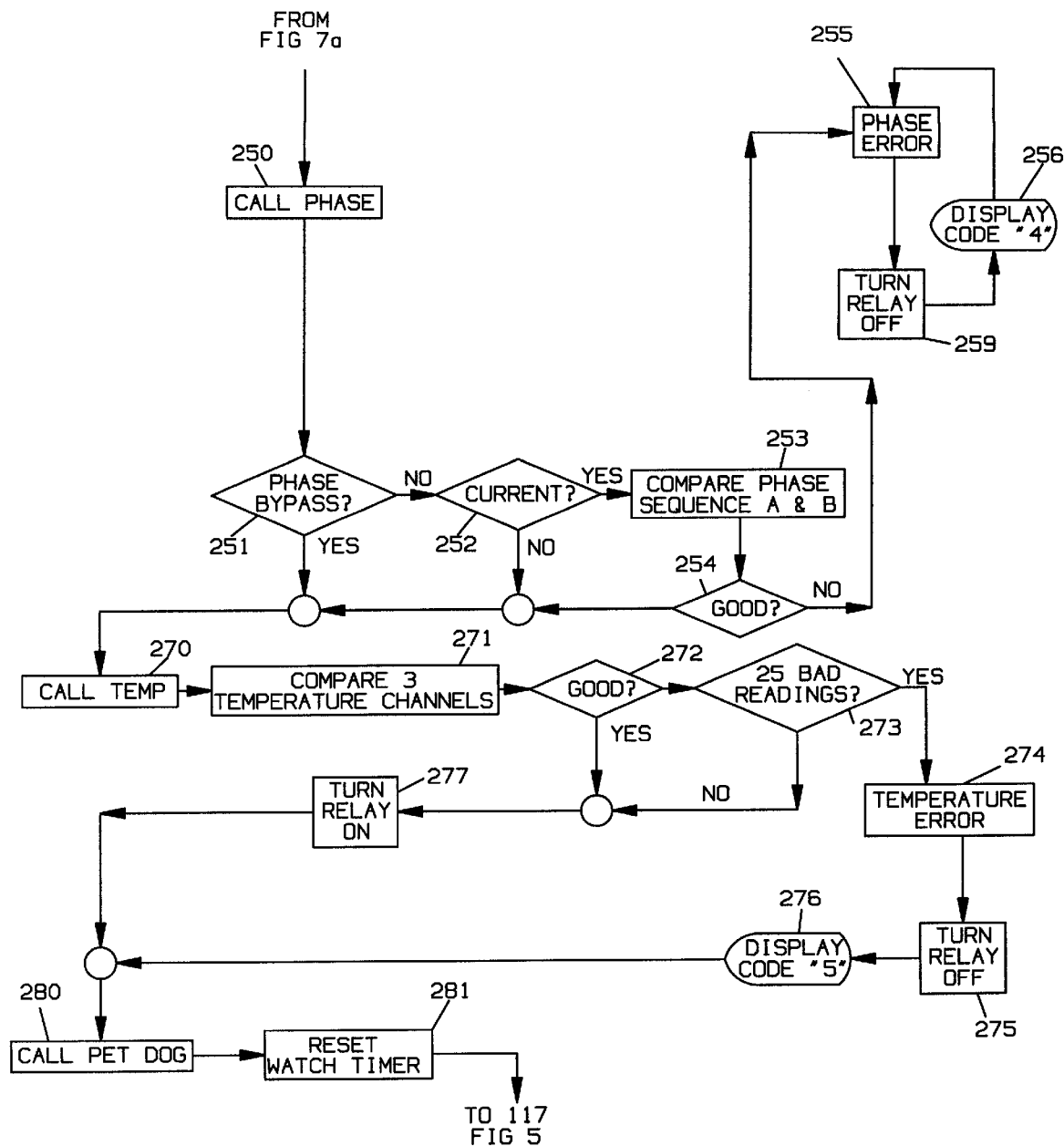

A current detection routine 203 is then used to detect motor operation. Upon detection of no current, the software advances to Call Level routine 191, 192 and 230 in FIG. 7. Otherwise, if there is no delay at 204 a Call Bal routine 205 is used by the MCU to determine if there is a detection of a current unbalance condition comprising steps 206, 207, 209, 211, 213, 215, 217, 219, 221, 223 and 225. A test 206 is used to determine the state of operation of the compressor. If the operating current is greater than a selected threshold, such as approximately 65% of the must hold current then compressor motor is in a loaded state whereas if the operating current is less than that threshold the motor is in an unloaded state. For a loaded condition, the MCU uses a current unbalance threshold of 17% at 207 and for an unloaded compressor condition, the MCU uses a current unbalance threshold of 25% at 217. A fault bank routine 209 and 219 is used respectively to accept 25 unacceptable readings before turning off the output circuit 34 of FIG. 1 and setting the fault diagnostic for a current unbalance code 2 at step 213 and code 3 at step 222, respectively. Unless the fault bank accumulates 25 unacceptable readings, 209 and 219, respectively, the MCU program advances to Call Level routine 192 and 230 (FIG. 7.)

Call level routine 230 comprising steps 231 through 248 is used by the MCU to compare measured current from the signal conditioning circuit 36a, 36b and 36c of FIG. 1 with six different trip levels 231, 234, 237, 240, 243 and 246, respectively. A fault bank routine is used to compare the accumulated unacceptable reading for each of the six trip levels 232, 235, 238, 241, 244 and 247. For any of the six trip levels, if the fault bank routine detects a current overload condition, the MCU will execute an Overload sub-routine 260 and 261 which in turn de-energizes the output circuit 34 of FIG. 1 and sets the fault diagnostic 262 for a current overload error code 1. Unless any of the fault bank routines detects a current overload condition, the MCU advances the software to the Call Phase routine 265 and 250. A Call Phase routine is performed if the MCU does not detect a bypass jumper J3 at step 251. If a bypass jumper is detected, the software proceeds to the Call Temp routine 270. Otherwise, a current test is performed at 252 to ensure that current is detected. If current is detected, a comparison test at 253 is used to compare the phase sequence between phase A and phase B. Upon detection of an unacceptable phase sequence, a Phase Error sub-routine 255, 256 and 259 is used to turn off the output circuit 34 of FIG. 1 and to set the fault diagnostic 262 of an improper phase sequence error code 4. Unless an improper phase sequence is detected, the software advances to a Call Temp routine 270. A Call Temp routine compares the resistance reading for each of the three channels of the over temperature section 32 of FIG. 1. Upon detection of an unacceptable resistance reading at 272, the software uses a fault bank routine 273 to compare the accumulated number of unacceptable resistance readings to a selected pre-determined level. Upon detection of an accumulated 25 unacceptable resistance readings, a temperature error sub-routine 274, 275 and 276 is used by the MCU to turn off the output circuit 34 of FIG. 1 and set a fault diagnostic for an over temperature error code 5. In order to reset an accumulated 25 acceptable readings must be incremented. Upon detection of 25 accumulated acceptable samples, the relay K1 is turned on at step 277. Upon completion of the Call Temp routine 270, a Call PetDog routine 280 and 281 is used to reset the MCU's internal timer which in turn prevents the MCU from turning off the output circuit 34 due to an acceptable internal condition, and sets the fault diagnostic circuit 42 of FIG. 2a for a calibration error detected. Upon completion of a Call PetDog routine, the MCU U5 of FIG. 2a uses the software to execute a Must Hold Setting test 117 which in turn begins another sampling of the current and temperature sensor inputs used by the MCU to perform the above mentioned series of routines and sets the fault diagnostic circuit 42 of FIG. 2a for a calibration error detected protection.

As mentioned above, the fault bank routines operate by incrementing a counter for each sample that is unacceptable and decrements the counter for each sample that is acceptable with output circuit 34 being de-energized whenever the counter increments to a selected level.

A system was made in accordance with the invention having the following components:

| Reference Designator | Component Description | Reference Designator | Component Description |
| --- | --- | --- | --- |
| R1 | 24.9 KΩ | R12 | 102 KΩ |
| R2 | 102 KΩ | R13 | 102 KΩ |
| R3 | 102 KΩ | R14 | 61.9 KΩ |
| R4 | 61.9 KΩ | R15 | 10 KΩ |
| R5 | 24.9 KΩ | R16 | 10 KΩ |
| R6 | 1.1 KΩ | R17 | 499 KΩ |
| R7 | 100Ω | R19 | 10 KΩ |
| R8 | 499 KΩ | R20 | 102 KΩ |
| R9 | 102 KΩ | R21 | 61.9 KΩ |
| R10 | 100Ω | R22 | 102 KΩ |
| R11 | 100Ω | R23 | 102 KΩ |
| R24 | 100Ω | U3 | DF04M |
| R25 | 240Ω | U4A | LMC6492 |
| R26 | 10 KΩ | U4B | LMC6492 |
| R27 | 102 KΩ | U5 | TMS370CX2X |
| R28 | 56.2 KΩ | U6 | TLC2543IN |
| R29 | 10 KΩ | U7 | LN513RA |
| R30 | 102 KΩ | U8 | TL7726 |
| R31 | 102 KΩ | U9 | MX045 |
| R32 | 102 KΩ | Q1 | MJD31C |
| R33 | 330Ω | Q2 | MPS3904 |
| R34 | 49.9 KΩ | Q3 | MPS3904 |
| R35 | 150 KΩ | Q4 | MPS3904 |
| R36 | 12.7 KΩ | MOV | 0047ZR05D |
| R37 | 102 KΩ | K1 | 30421-1 |
| R38 | 102 KΩ | J1 | 1-104436-0 |
| R39 | 102 KΩ | J2 | 3-822275-1 |
| R40 | 680Ω | CT1 | Toroid |
| R41 | 680Ω | CT2 | Toroid |
| R42 | 680Ω | CT3 | Toroid |
| R43 | 680Ω | T1 | 24123-1 |
| R44 | 680Ω | T2 | 24123-1 |
| R45 | 680Ω | M1 | 24123-1 |
| R46 | 680Ω | M2 | 24123-1 |
| R47 | 10 KΩ | C | 24123-1 |
| R48 | 10 KΩ | S1 | PTC |
| R49 | 10 KΩ | S2 | PTC |
| R50 | 10 KΩ | S3 | PTC |
| R51 | 10 KΩ | B | 24123-1 |
| R52 | 10 KΩ | G | 24123-1 |
| R53 | 10 KΩ | C1 | 10 MFD |
| R54 | 10 KΩ | C2 | 1000 MFD |
| R55 | 10 KΩ | C3 | 470 MFD |
| U1 | DF04M | C4 | 1000 MFD |
| U2 | DF04M | C5 | 1000 MFD |
| C7 | 0.1 MFD | C19 | 1 MFD |
| C8 | 0.1 MFD | C20 | 0.1 MFD |
| C9 | 0.1 MFD | C21 | 0.1 MFD |
| C10 | 0.1 MFD | C22 | 0.1 MFD |
| C11 | 0.1 MFD | C23 | 0.1 MFD |
| C12 | 220 PFD | C24 | 0.1 MFD |
| C13 | 0.1 MFD | C25 | 0.1 MFD |
| C14 | 0.1 MFD | D1 | 1N4004 |
| C15 | 1 MFD | D2 | 1N4004 |
| C16 | 0.47 MFD | Z1 | TL431 |
| C17 | 10 MFD | Z2 | MMSZ4680T1 |
| C18 | 1 MFD | U10 | DIP SWITCH |

It will be seen from the above that the described multi-function protection system protects screw compressors against over temperature conditions, current overload conditions, improper phase current sequence conditions, current unbalance conditions, low power supply voltage conditions, contactor chattering conditions, primary single phasing conditions and loss of phase conditions. In addition to these protection functions, this protection system provides a phase current measurement interface and a start timer function for three phase motors having reduced voltage starter configurations.

It should be understood that although a particular embodiment of the invention has been described by way of illustrating the invention, the invention includes all modifications and equivalents thereof falling within the scope of the appended claims.

What is claimed:

1. A method of protecting electrical equipment having phase windings comprising the steps of
   generating an electrical signal corresponding to the current level in each phase winding of the electrical equipment,
   placing a temperature dependent resistor in heat transfer with each phase winding and generating an electrical signal corresponding to the temperature in each phase winding,
   converting the electrical signals to binary coded data,
   inputting the binary coded data into a microcomputer and comparing the inputted coded data to selected parameters to identify over temperature and over current fault conditions,
   integrating current unbalance protection by using the binary coded data corresponding to the current level and comparing the current level in the respective phase windings to an operating current threshold based on the rated amperage of the electrical equipment both for a loaded and an unloaded state using a first set of parameters for the loaded state and a second set of parameters for the unloaded state, and
   de-energizing the electrical equipment by outputting a control signal from the micro-controller upon the occurrence of a fault condition to de-energize the electrical equipment.

2. A method according to claim 1 further comprising the steps of taking a selected number of samples of phase winding current level and phase winding temperature, comparing the samples to selected parameters, samples not exceeding their respective parameters being acceptable and samples exceeding their respective parameters being unacceptable, incrementing a counter for each unacceptable sample, decrementing the counter for each acceptable sample, and generating the control signal when the counter has incremented to a selected level.

3. A method according to claim 2 in which the phase current levels are used to identify improper phase sequences and loss of phase conditions as fault conditions.

4. A method according to claim 1 further comprising the steps of taking phase winding current samples for each phase winding and comparing the samples to a series of different percentage overload current parameters, each sample which has a value below the respective percentage overload current parameter being an acceptable sample and incrementing a fault bank counter for each acceptable sample over a unique time period for the respective percentage overload current parameter, and generating the control signal to de-energize the electrical equipment if the counter does not increment to a unique selected level for the respective percentage overload current parameter within the respective time period, and repeating the comparison of samples for each different percentage overload current parameter if the counter does increment to the unique selected level for each different percentage overload current parameter.

5. A method according to claim 4 in which the unique percentage overload current parameters range from 400% overload current with 10 acceptable samples in a 1.5 second time period to 112% overload current with 250 acceptable samples in a 25 second time period.

6. A multi-function electronic protection system for electrical equipment such as screw compressors having three phase windings comprising:
   a three phase current transducer circuit having three current toroids, a full wave bridge rectifier for each toroid having an input and an output, the input of a respective rectifier connected to each current toroid and a respective voltage divider network coupled to the output of each rectifier,
   an analog-to-digital converter (ADC) having inputs and outputs, each voltage divider network coupled to a respective input of the ADC for providing binary coded data from the ADC related to the phase current of a respective phase winding,
   a temperature sensing circuit having three temperature dependent resistors, a respective voltage divider network coupled to each temperature dependent resistor, each voltage divider network of the temperature sensing circuit coupled to another respective input of the ADC for providing binary coded data from the ADC related to the temperature of each temperature dependent resistor,
   a micro-controller having inputs and outputs, the ADC connected to the micro-controller so that the binary coded data of the ADC are fed to respective inputs of the micro-controller,
   means for taking samples of phase current and temperature samples using the current transducer circuit and the temperature sensing circuit,
   a first maximum current level being stored in the micro-controller for each of a loaded compressor state and an unloaded compressor state for at least two of the phase windings, means for comparing the binary coded data relating to the phase winding current of the respective at least two phase windings and means for developing a current unbalance signal when the current level of either of the at least two phase windings exceeds the maximum current level, and
   an output control device having an input and an output, the micro-controller coupled to the input of the output device to control the state of energization of the output control device in response to the current levels of the respective phase windings and the temperature of the respective temperature dependent resistors.

7. A multi-function electronic protection system according to claim 6 further comprising means for distinguishing between binary coded data for current and temperature caused by electromagnetic transients and real fault conditions.

8. A multi-function electronic protection system according to claim 7 in which the means for distinguishing between binary coded data for current and temperature caused by electromagnetic transients and real fault conditions includes a fault bank counter and means to increment the counter for current and temperature samples which are above the selected parameters a selected number of times, the micro-controller means generating a control signal to the output device when the counter has incremented to a selected level.

9. A multi-function electronic protection system according to claim 6 further comprising a fault bank counter for distinguishing electromagnetic transients and real fault conditions for over temperature, current overload, current unbalance, improper phase sequence and loss of phase samples.

* * * * *